US010451823B2

(12) United States Patent
Emery et al.

(10) Patent No.: US 10,451,823 B2
(45) Date of Patent: Oct. 22, 2019

(54) LASER MODULE SERVICE SHELF

(71) Applicant: NLIGHT, INC., Vancouver, WA (US)

(72) Inventors: Joseph J. Emery, Vancouver, WA (US); Rodney Stephens, Vancouver, WA (US); Eric Martin, Vancouver, WA (US); Jeremy Young, Vancouver, WA (US); Shelly Lin, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 15/687,093

(22) Filed: Aug. 25, 2017

(65) Prior Publication Data

US 2018/0059342 A1    Mar. 1, 2018

Related U.S. Application Data

(60) Provisional application No. 62/380,264, filed on Aug. 26, 2016.

(51) Int. Cl.
*G02B 6/42* (2006.01)
*A47B 88/50* (2017.01)
(Continued)

(52) U.S. Cl.
CPC ............ *G02B 6/4256* (2013.01); *A47B 57/06* (2013.01); *A47B 88/50* (2017.01); *B23K 1/0056* (2013.01); *B23K 26/21* (2015.10); *B23K 26/38* (2013.01); *B23K 26/703* (2015.10); *G02B 6/4446* (2013.01); *G02B 6/4447* (2013.01);
(Continued)

(58) Field of Classification Search
CPC .. G02B 6/4256; G02B 6/4446; G02B 6/4447; A47B 57/06; A47B 88/50
See application file for complete search history.

(56) References Cited

U.S. PATENT DOCUMENTS 2,956,688 A * 10/1960 Galassi ................... A47F 5/103
108/108
3,128,074 A * 4/1964 Schwarz ............... A47B 57/567
108/108
(Continued)

OTHER PUBLICATIONS

International Search Report and Written Opinion for International Patent Application No. PCT/US17/48679, dated Nov. 6, 2017.
(Continued)

*Primary Examiner* — Thomas A Hollweg
*Assistant Examiner* — Mary A El-Shammaa
(74) *Attorney, Agent, or Firm* — Green, Howard & Mughal LLP

(57) ABSTRACT

A laser module service shelf is generally presented. In some embodiments, a laser system includes a rack including a stack of slots to support a plurality of laser modules in first positions within the rack, wherein the rack comprises a pair of struts extending at opposite sides of an opening in the rack through which the laser modules may pass, and a module service shelf attachable to the struts to support a weight of one of the laser modules in a second position that is cantilevered from the rack in alignment with the opening and one of the slots, wherein the module service shelf comprises a plurality of detachable sections. Other embodiments are also disclosed and claimed.

20 Claims, 16 Drawing Sheets

(51) Int. Cl.

| | |
|---|---|
| *A47B 57/06* | (2006.01) |
| *G02B 6/44* | (2006.01) |
| *B23K 1/005* | (2006.01) |
| *B23K 26/38* | (2014.01) |
| *B23K 26/21* | (2014.01) |
| *B23K 26/70* | (2014.01) |
| *H01S 3/02* | (2006.01) |
| *H01S 3/094* | (2006.01) |
| *H01S 3/0941* | (2006.01) |

(52) U.S. Cl.
CPC ............ *H01S 3/025* (2013.01); *H01S 3/0941* (2013.01); *H01S 3/094053* (2013.01)

(56) References Cited

U.S. PATENT DOCUMENTS

| | | | | |
|---|---|---|---|---|
| 4,360,181 | A * | 11/1982 | Burkholder | A47B 96/061 108/108 |
| 5,771,325 | A | 6/1998 | Neuberger | |
| 5,913,584 | A * | 6/1999 | Swindell | A47B 57/06 108/108 |
| 6,065,821 | A * | 5/2000 | Anderson | A47B 57/06 108/108 |
| 6,158,599 | A | 12/2000 | Lazarus | |
| 7,200,317 | B2 | 4/2007 | Reagan et al. | |
| 8,488,245 | B1 | 7/2013 | Chann et al. | |
| 8,995,812 | B2 * | 3/2015 | Ciechomski | G02B 6/4455 385/134 |
| 9,645,317 | B2 * | 5/2017 | Isenhour | G02B 6/3849 |
| 2005/0025444 | A1 * | 2/2005 | Barnes | A47B 88/08 385/135 |
| 2005/0127017 | A1 * | 6/2005 | Kessel | A47B 57/06 211/187 |
| 2005/0265013 | A1 * | 12/2005 | Keith | H04Q 1/142 361/826 |
| 2006/0157436 | A1 | 7/2006 | Iwamoto | |
| 2010/0054682 | A1 * | 3/2010 | Cooke | G02B 6/4452 385/135 |
| 2010/0118483 | A1 * | 5/2010 | Kurokawa | G06F 1/187 361/679.33 |
| 2010/0310225 | A1 * | 12/2010 | Anderson | G02B 6/4455 385/135 |
| 2012/0080391 | A1 | 4/2012 | Nakamura et al. | |
| 2012/0189260 | A1 * | 7/2012 | Kowalczyk | G02B 6/44 385/135 |
| 2012/0288248 | A1 * | 11/2012 | Chapa Ramirez | G02B 6/4452 385/135 |
| 2012/0301083 | A1 * | 11/2012 | Carter | H04Q 1/09 385/76 |
| 2013/0308908 | A1 * | 11/2013 | Isenhour | G02B 6/3849 385/61 |
| 2014/0042886 | A1 * | 2/2014 | Baldo | F25D 25/02 312/405.1 |
| 2014/0105676 | A1 * | 4/2014 | Keffeler | H05K 7/1487 403/327 |
| 2014/0204537 | A1 * | 7/2014 | Rust | G11B 33/128 361/727 |
| 2014/0314384 | A1 * | 10/2014 | Nair | G02B 6/4441 385/135 |
| 2015/0016796 | A1 * | 1/2015 | Chatellard | H04Q 1/13 385/135 |
| 2015/0077924 | A1 * | 3/2015 | Rauline | H05K 7/1489 361/679.39 |
| 2015/0189787 | A1 * | 7/2015 | Bailey | H05K 7/1489 361/679.48 |
| 2016/0231525 | A1 * | 8/2016 | Murray | G02B 6/4439 |

OTHER PUBLICATIONS

International Preliminary Report on Patentability for PCT Application No. PCT/US17/48679, dated Mar. 7, 2019.

* cited by examiner

LASER MODULE SERVICE SHELF

CLAIM OF PRIORITY

The present application claims priority to U.S. Provisional Patent Application No. 62/380,264 filed on Aug. 26, 2016, entitled "LASER MODULE SERVICE SHELF", which is incorporated by reference in its entirety.

BACKGROUND

Lasers are commonly used in materials processing, including cutting, welding, brazing, surface treatment and other applications. Industrial laser products can employ several different modules mounted in a system. These modules are often loosely based on the 19" rack mount standard. As the technology has progressed over time, the weight of these modules has reached in excess of 100 lbs. Installing and removing 100 lb modules is not straightforward and requires some mechanical assistance in order to be done safely and correctly. Additionally, these modules can be located anywhere from 12" off the floor to 40" off the floor. Servicing these laser systems in the field would require personnel to locate some type of adjustable lifting mechanism, or tables, or carts matching the height of the location of the modules in the system in order to take the weight of the module during removal for replacement or servicing. Alternatively, several service personnel could perform the task working together, but sending several personnel to a customer site to replace or service a module would be an inefficient use of resources. Performing this task without some mechanical means of assistance would be difficult. Therefore, there is a need for efficient mechanical solutions to allow a single technician to service laser system modules.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
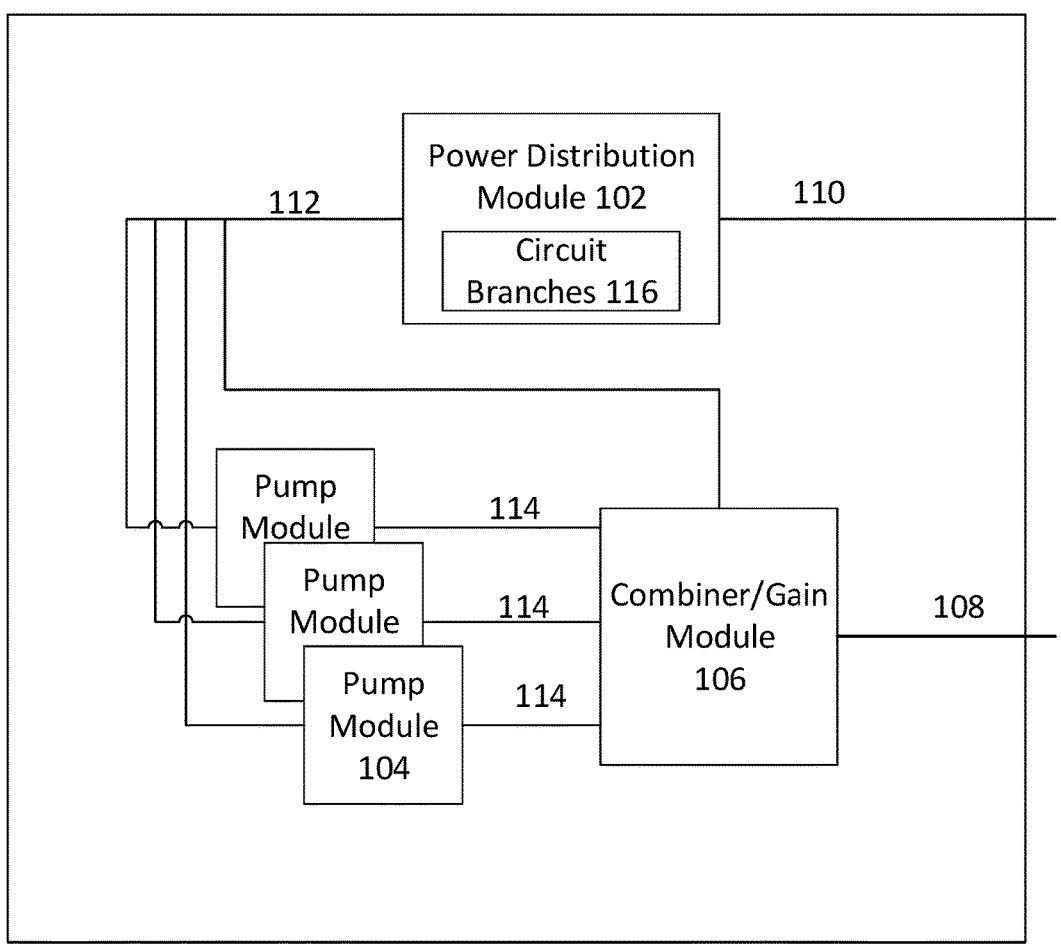
FIG. 1 is a block diagram of an example laser system, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

A laser system generally includes a rack with a plurality of laser modules mounted in the rack to drive light through an optical fiber exiting the system. These modules can be slid out of the rack through an opening, however they can be very heavy and difficult for one person to handle. In some embodiments described hereinafter, the module service shelf may be attachable at each respective module height location in the laser system as needed, and the modules can then be slid out onto the shelf. In addition, the shelf has been designed to fit inside of the system for storage when not in use for servicing modules. The shelf is capable of taking the weight of the modules with some additional capacity. It is easily installed and removed both in the operation positions, and in the storage positions. The shelf enables a service organization to send fewer service personnel to customer sites, reducing the cost of a service visit. The shelf is designed to enable removal of all modules in the system. The orientation of the shelf was also designed such that one and only one orientation can be implemented for each respective module. Additionally, storage locations were designed into the system so that shelf components can be stored internally to the system.

A block diagram of an example laser system that may benefit from incorporating embodiments of the present invention is depicted in FIG. 1. As shown, laser system 100 includes power distribution module 102, pump modules 104, combiner/gain module 106, exit fiber 108, AC input 110, AC output 112, optical fibers 114, and circuit branches 116. Different and/or additional modules may be included in laser system 100 without deviating from the scope of the present invention. For example, separate or multiple combiner/gain modules may be used. Also, any number of pump modules 104 may be present. In one embodiment, six pump modules are included in laser system 100. Laser system 100 may be a direct diode laser system, a fiber laser system, or any other type of laser system that may benefit from incorporating embodiments of the present invention.

Power distribution module 102 may distribute power in the form of AC Voltage received as AC input 110 to pump modules 104 and combiner/gain module 106 through AC output 112. Circuit branches 116 within power distribution module 102 may include circuit components to branch AC input 110 into multiple independent AC outputs 112. In some embodiments, AC input 110 is 3 phase AC which is distributed through circuit branches 116 as single phase AC outputs 112. In some embodiments, circuit branches 116 may also convert AC Voltage to DC Voltage for use with additional components (not shown) in laser system 100.

Circuit branches 116 may include a circuit breaker, a contactor, a line filter, and/or a terminal block for each AC output 112. The components of circuit branches 116 may be chosen based on the voltage and current requirements of modules 104 and 106. In one embodiment, each of AC outputs 112 provide 480 VAC, though the present invention is not so limited. In some embodiments, AC output 112 may vary by module. For example, AC output 112 may deliver a different voltage or a same voltage at a different amperage to pump module 104 than AC output 112 delivers to combiner/gain module 106.

Circuit branches 116 may be designed to protect modules coupled with AC outputs 112 from damage caused by overcurrent or overload or short circuit. Circuit branches 116 may interrupt current flow through one or more of AC outputs 112 after protective relays detect a fault. Circuit branches 116 may be manually or automatically resettable after a fault. Additionally, circuit branches 116 may attenuate conducted electromagnetic interference (EMI) from AC input 110 to AC outputs 112. Circuit branches 116 may be controlled by software or firmware either internal to or external from laser system 100.

One or more pump modules 104 may be included in laser system 100 to drive light through optical fibers 114. In some embodiments, each of pump module 104 may include a DC power supply to convert AC output 112 into direct current that powers laser diodes. In some embodiments, each of pump module 104 includes one or more liquid-cooled coldplate(s) for heat dissipation.

Combiner/gain module 106 may include coiled fiber to increase light output and may combine optical fibers 114 into a single exit fiber 108 that exits laser system 100. Additional modules (not shown) may be included in laser system 100 to control and/or condition the light driven through exit fiber 108 when laser system 100 is operating.

Exit fiber 108 may have any diameter and length. In one embodiment, exit fiber 108 is up to 75 feet in length. Exit fiber 108 may be a single length of fiber or may be multiple lengths of fiber coupled together. In some embodiments, a first shorter exit fiber 108 is coupled with a coupler or other optical product which is coupled with a second longer fiber. Additionally, in some embodiments exit fiber 108 may be single clad while in some embodiments exit fiber 108 may be double clad.

Figure 2:
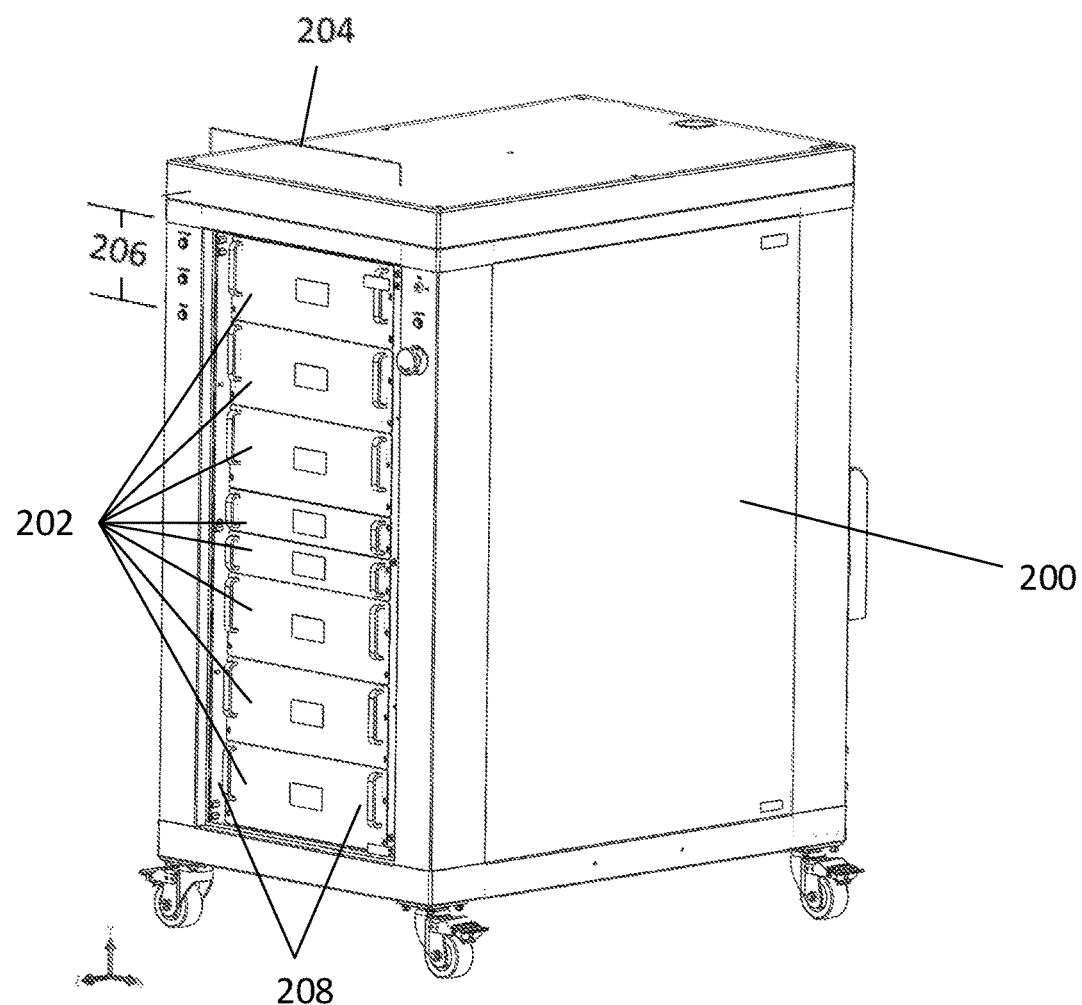
FIG. 2 is a drawing of an example laser system, in accordance with some embodiments.

Turning now to FIG. 2, a drawing of an example laser system, in accordance with some embodiments, is shown. Laser system 100 may include rack 200, laser modules 202, rack opening 204, slots 206 and handles 208. Rack 200 may provide the structure and mounting points for supporting and containing the various modules of laser system 100. Rack 200 may be of standard or non-standard dimensions. Rack 200 may include additional elements not shown or may be implemented without all elements shown (for example wheels).

In some embodiments, rack 200 includes a 23-inch standardized rack frame for mounting laser modules 202. In some embodiments, rack 200 includes a 19-in standardized rack frame. In other embodiments, different rack widths may be used. In some embodiments the height of rack 200 is standardized in multiples of 1.752 inches or one rack unit or U. In one embodiment, rack 200 is 28 U tall. In other embodiments different rack heights may be used. In some embodiments, rack 200 is a four vertical post rack that allows for mounting rails to support laser modules 202 at the front and rear. In other embodiments, rack 200 is a two vertical post rack. In some embodiments, rack 200 is open in construction, while in other embodiments rack 200 is enclosed, for example by doors, side panels and a top.

Rack 200 may have provisions for airflow and cooling of laser modules 202. In some embodiments, front and/or side air intakes are included as well as rear exhaust. Forced air fan cooling may or may not be included. In some embodiments, liquid cooling is provided to each of laser modules 202 in the form of coldplates supported by conduit, pumps, liquid inlets, liquid outlets, and drains.

Laser modules 202 (which may include pump module 104 and combiner/gain module 106) are mounted within rack 200. Due to the size and number of components in each of laser modules 202, they may each weight in excess of 100 pounds. Steel reinforced shelfs and mounts internal to rack 200 may secure each of laser modules 202 in place. Rack 200 may be designed to accept a certain number and size of laser modules 202 at certain locations. In some embodiments, laser modules 202 are homogeneous in height, while in other embodiments laser modules 202 are a heterogeneous mix of heights. Laser modules 202 may be able to slide through an opening 204 of rack 200 for installation and removal, for example by pulling or pushing on handles 208. Opening 204 may substantially match the width of laser modules 202, which may correspond to a standard rack size, for example 19 inches.

Slots 206 may include internal supports and attachment points to attach laser modules 202 at specific locations. In some embodiments, where rack 200 is 28 U in height, there may be 7 slots 206 that are each 4 U in height. In other embodiments, there may be 6 slots 206 that are 4 U in height and 2 slots 206 that are 2 U in height. Other combinations and permutations may be used within embodiments of the present invention.

Figure 3:
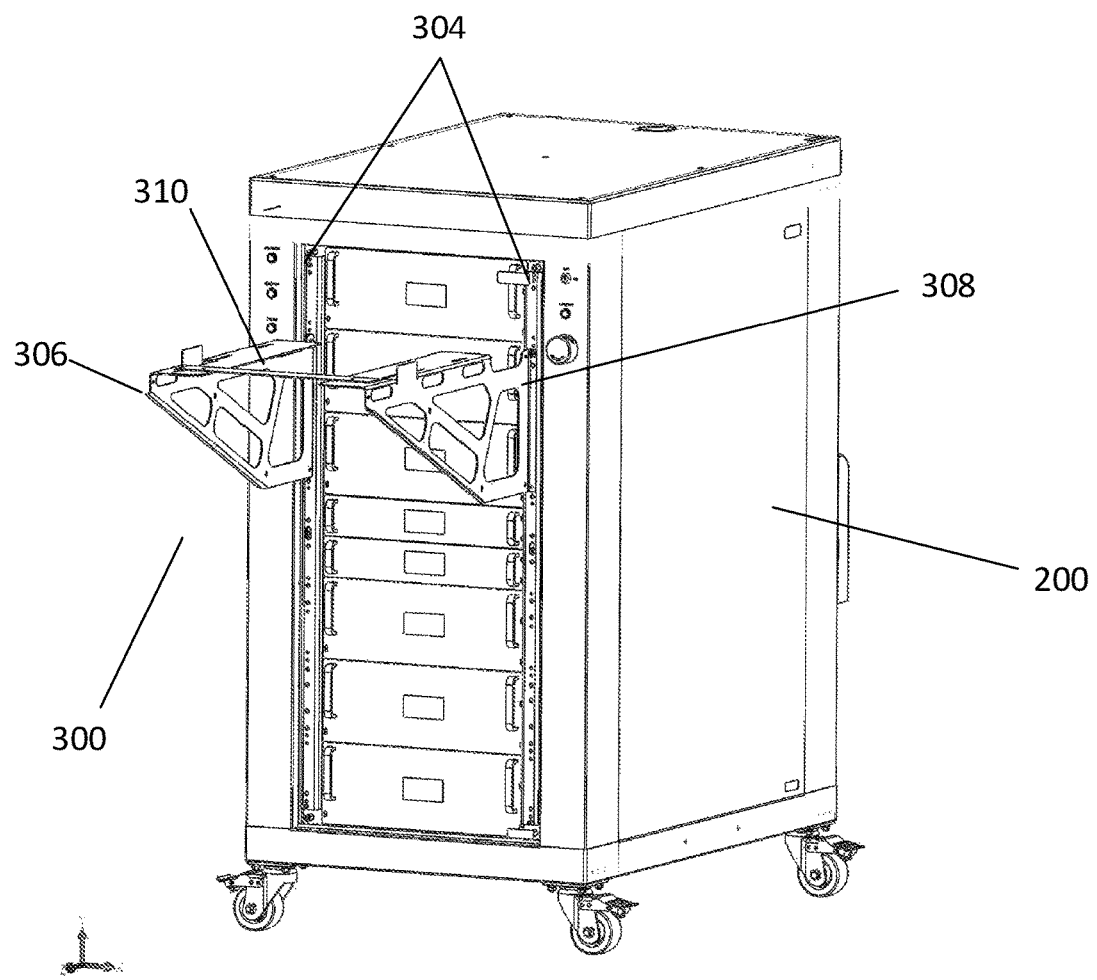
FIG. 3 is a drawing of an example laser system including a module service shelf, in accordance with some embodiments.

FIG. 3 is drawing of an example laser system including a module service shelf, in accordance with some embodiments. As shown, laser system 100 may include rack 200, module service shelf 300, attachment struts 304, shelf arm 306, shelf arm 308 and shelf crossbeam 310. Module service shelf 300 may be able to align with a slot 206 in rack 200 and accept and support the weight of a laser module 202 that has been pulled out of rack 200 through opening 204. One skilled in the art would appreciate that module service shelf 300 can provide an external module support surface to allow a single technician to service laser modules 202 safely and efficiently. While shown as being attached to service a top laser module 202, module service shelf 300 may be attached at other locations to service other laser modules 202.

Module service shelf 300 may contain discrete detachable sections that can be quickly assembled and disassembled as needed. In some embodiments, module service shelf 300 includes three detachable sections: shelf arm 306, shelf arm 308 and shelf crossbeam 310. In other embodiments, more or fewer detachable sections may be used. After, or as part of, assembly, module service shelf 300 may be attached to attachment struts 304. Attachment struts 304 may have an index of discrete attachment points that allow module service shelf 300 to be attached (and in some embodiments only attached) in alignment with slots 206 for servicing of laser modules 202.

Figure 4:
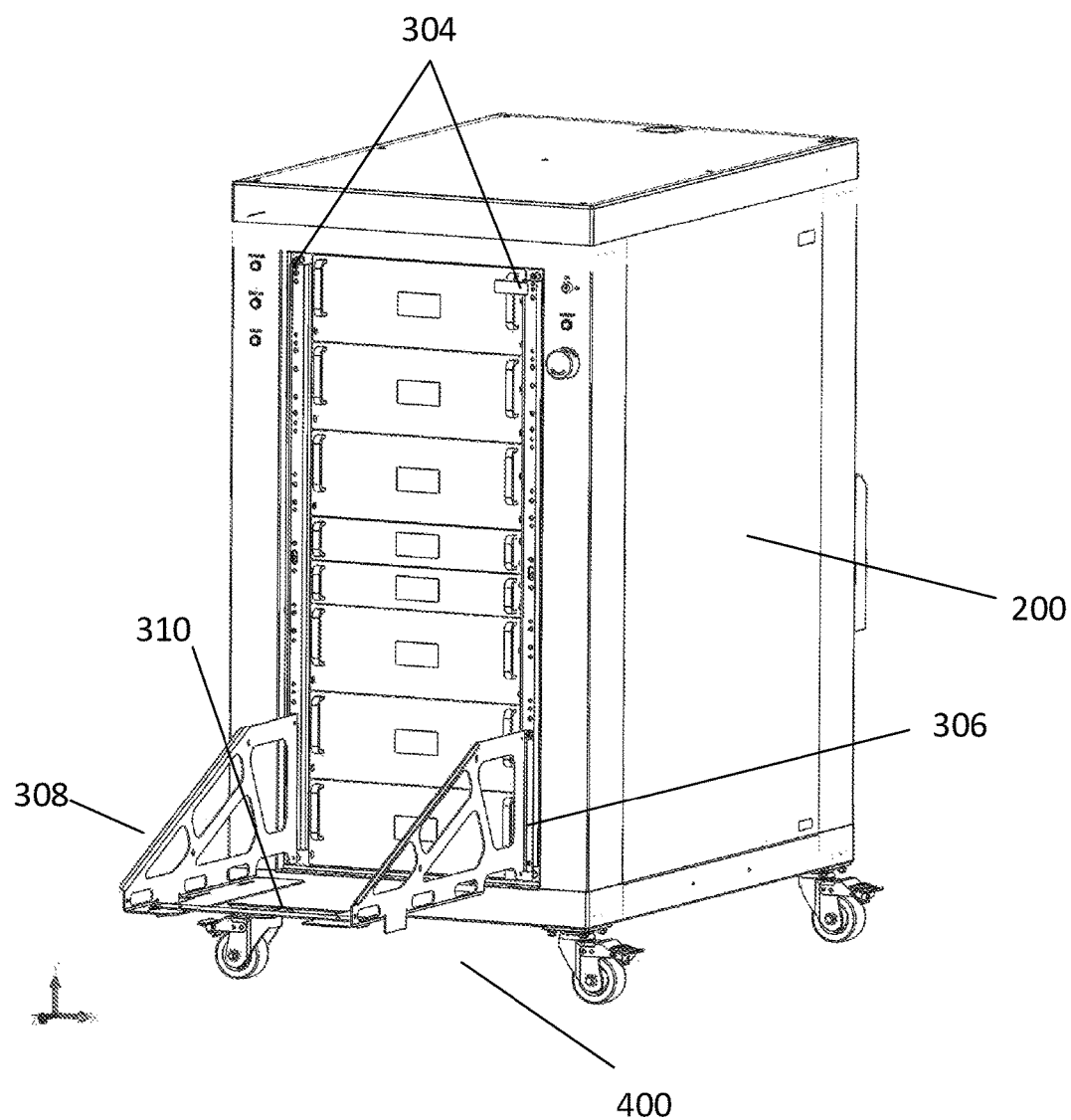
FIG. 4 is a drawing of an example laser system including a module service shelf, in accordance with some embodiments.

FIG. 4 is a drawing of an example laser system including a module service shelf, in accordance with some embodiments. As shown, laser system 100 may include rack 200, module service shelf 400, attachment struts 304, shelf arm 306, shelf arm 308 and shelf crossbeam 310. While shown as being attached to service a bottom laser module 202, module service shelf 400 may be attached at other locations to service other laser modules 202. Module service shelf 400 may include the same detachable sections shelf arm 306, shelf arm 308, and shelf crossbeam 310 as module service shelf 300, but in some embodiments they are assembled in different manners or orientations.

Attachment struts 304 may be attached by screws or other temporary or permanent fasteners to a frame structure of rack 200 to distribute the weight of a laser module 202 being supported by module service shelf 300 or 400.

Figure 5:
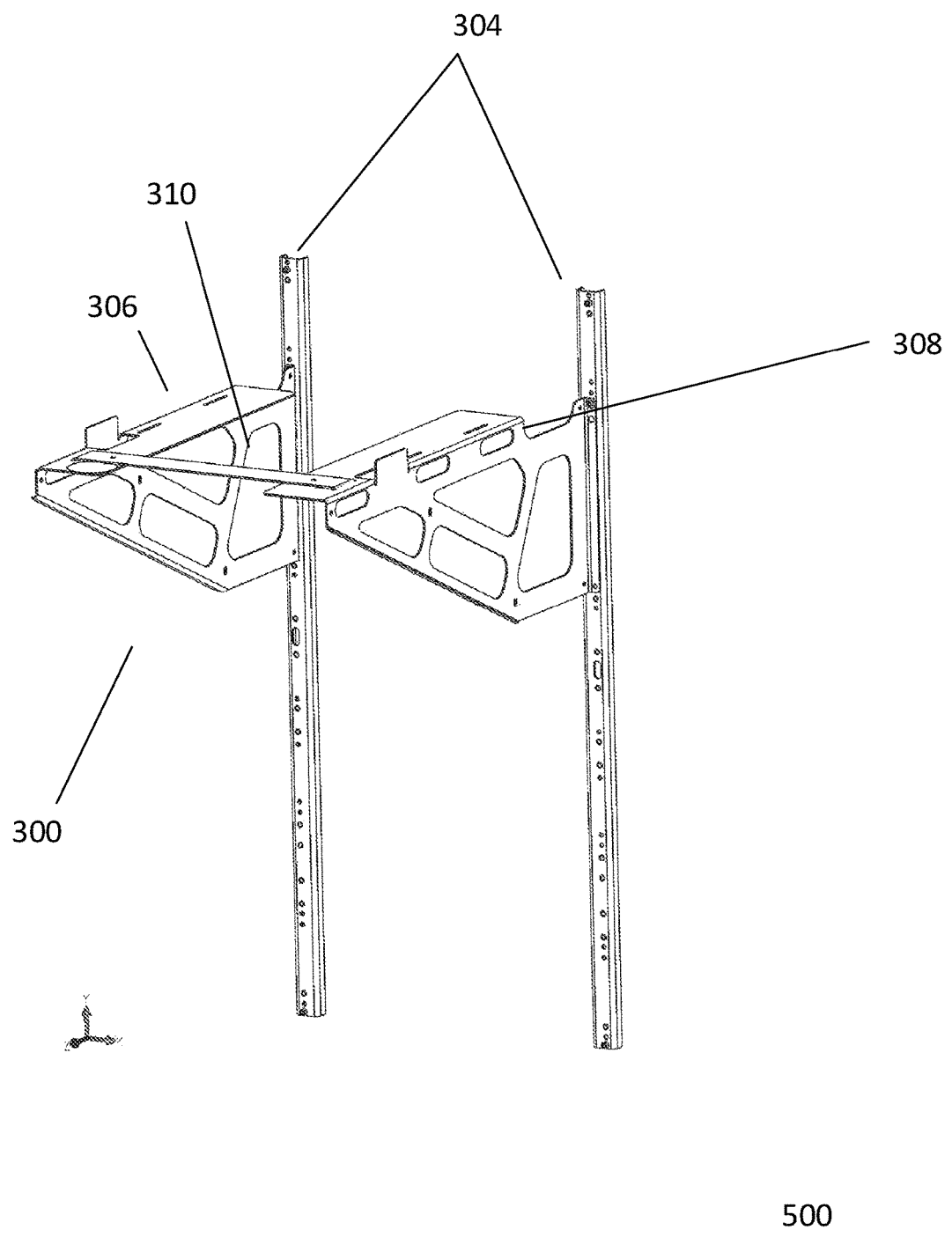
FIG. 5 is a drawing of an example module service shelf attachment, in accordance with some embodiments.

FIG. 5 is a drawing of an example module service shelf attachment, in accordance with some embodiments. As shown, assembly 500 may include module service shelf 300, attachment struts 304, shelf arm 306, shelf arm 308 and shelf crossbeam 310. Assembly 500 may represent portions of FIG. 3, without rack 200 shown for further understanding. While attachment struts 304 may be easily removable from rack 200, in some embodiments attachment struts 304 are intended to be stored and used attached to rack 200 at opposite sides of opening 204.

As shown in more detail hereinafter, shelf arm 306 and shelf arm 308 may have various combinations and permutations of fittings (in terms of quantity and type) to mate with attachment points in attachment struts 304. As part of assembling module service shelf 300 or 400, the attachment of shelf arm 306 and shelf arm 308 with attachment struts 304 and shelf crossbeam 310 may be accomplished in any number of orders of steps. For example, shelf arms 306 and 308 may first be attached to attachment struts 304, in some embodiments, and shelf crossbeam 310 may be subsequently attached. Alternatively, shelf arms 306 and 306 may first be attached to shelf crossbeam 310, in some embodiments, and then module service shelf 300 may be subsequently attached to attachment struts 304.

Figure 6:
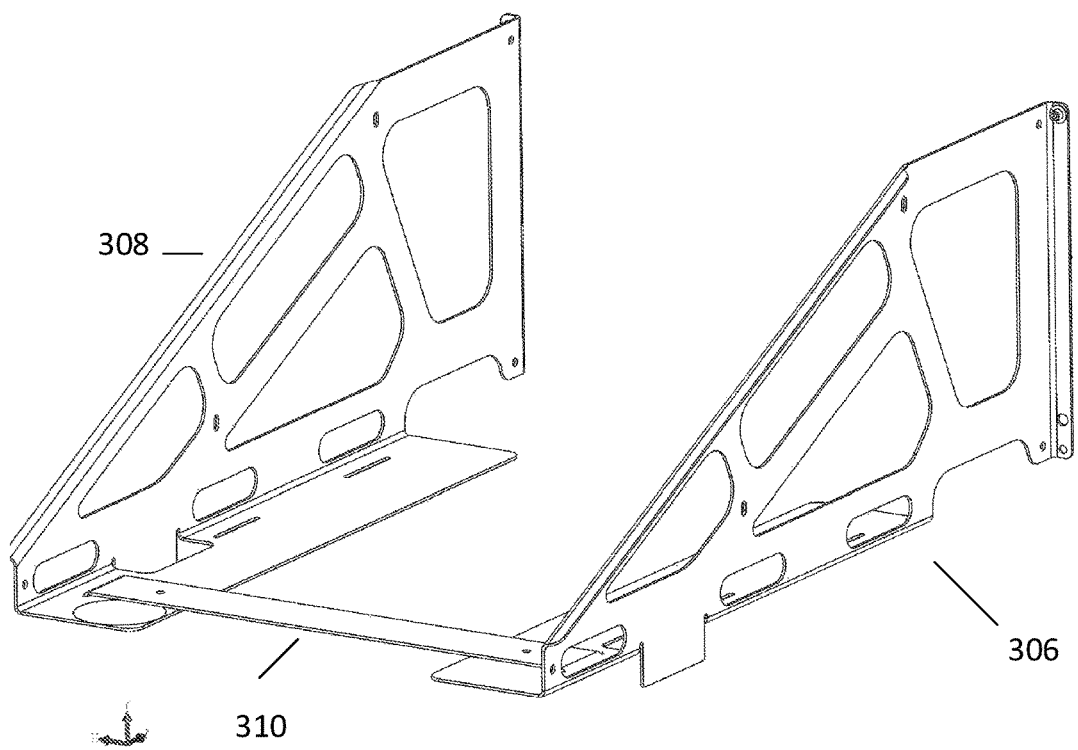
FIG. 6 is a drawing of an example module service shelf, in accordance with some embodiments.

FIG. 6 is a drawing of an example module service shelf, in accordance with some embodiments. As shown, module service shelf 400 may include shelf arm 306, shelf arm 308 and shelf crossbeam 310. In some embodiments, module service shelf 400 is the same as module service shelf 300, but is rotated 180 degrees about a longitudinal axis parallel to shelf arms 306 and 308. In some embodiments module service shelf 400 is used to service all laser modules 202 except for the topmost laser module 202, since attachment struts 304 may not extend high enough to attach with shelf arms 306 and 308, which may have a height that is greater than that of slot 206 in rack 200. In some embodiments, the external module support service provided by module service shelf 400 is on an internal side of shelf arms 306 and 308. Shelf arms 306 and 308 may also maintain a laser module 202 on module service shelf 400 in alignment with opening 204, thereby blocking sideways movement of laser module 202.

Figure 7:
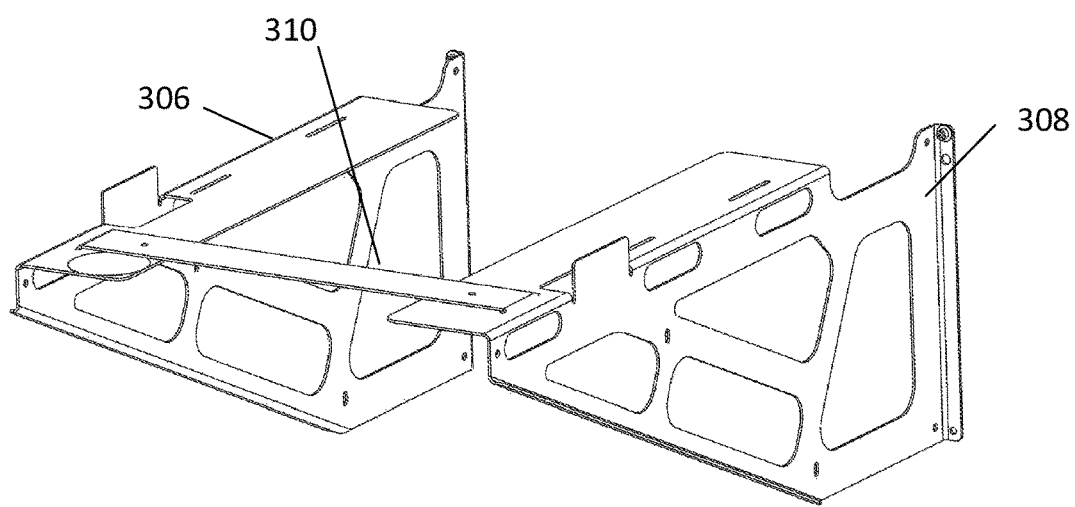
FIG. 7 is a drawing of an example module service shelf, in accordance with some embodiments.

FIG. 7 is a drawing of an example module service shelf, in accordance with some embodiments. As shown, module service shelf 300 may include shelf arm 306, shelf arm 308 and shelf crossbeam 310. In some embodiments module service shelf 300 is used to service only the topmost laser module 202, since attachment struts 304 may not extend high enough to allow the use of module service shelf 400. In some embodiments, the external module support service provided by module service shelf 300 is on an external side of shelf arms 306 and 308. Additional tabs may be included in shelf arm 306 and shelf arm 308, as shown in more detail hereinafter, to maintain a laser module 202 on module service shelf 300 in alignment with opening 204, thereby blocking sideways movement of laser module 202.

Figure 8:
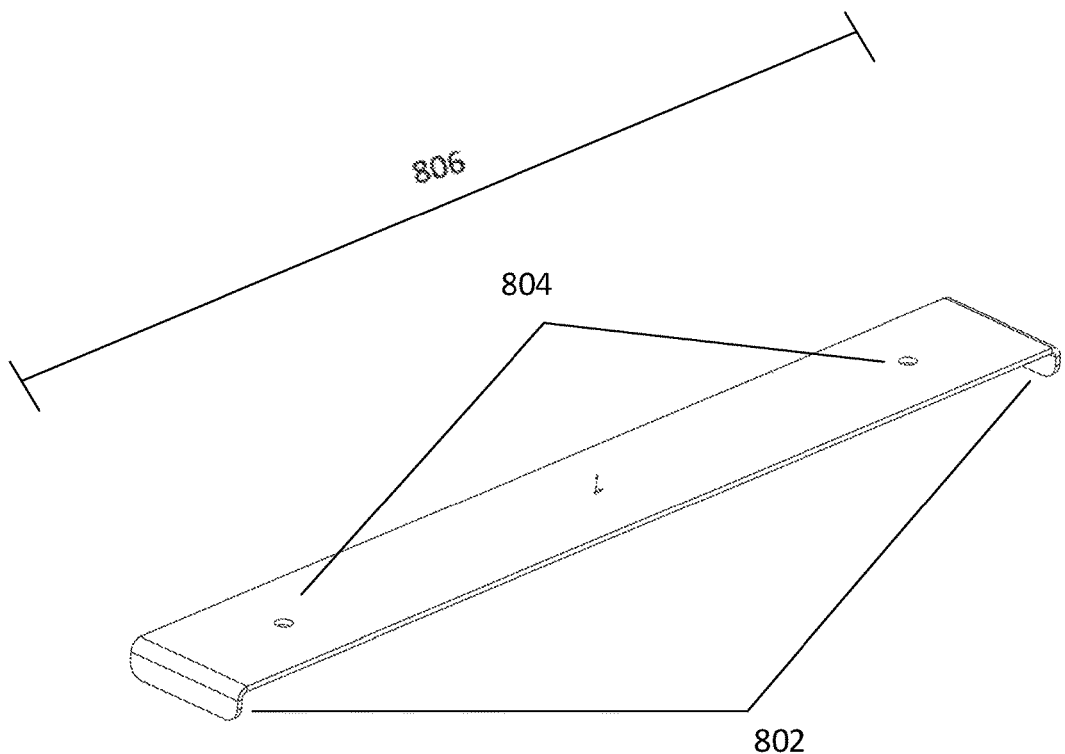
FIG. 8 is a drawing of an example module service shelf crossbeam section, in accordance with some embodiments.

FIG. 8 is a drawing of an example module service shelf crossbeam section, in accordance with some embodiments. As shown, shelf crossbeam 310 may include end tabs 802, mounting holes 804 and length 806. While shown as being a single straight beam with a pair of end tabs 802 at opposite ends, shelf crossbeam 310 may be more complex and have additional fittings to attach with shelf arm 306 and shelf arm 308. In some embodiments, shelf crossbeam 310 provides attachment between shelf arm 306 and shelf arm 308 to prevent them from separating to an extent greater than opening 204. In some embodiments, shelf crossbeam 310 may have a length similar to but not greater than that of opening 204. Mounting holes 804 may be included in shelf crossbeam 310 to fasten the attachment with shelf arms 306 and 308 and/or as part of a storage solution.

In some embodiments, end tabs 802 are installed in slots in shelf arms 306 and 308 facing down. In this way shelf crossbeam 310 may be installed from an interior direction relative to shelf arms 306 and 308 in module service shelf 400 and from an exterior direction in module service shelf 300. In module service shelves 300 and 400, shelf crossbeam 310 may be flush with the external module support surface or may be offset to provide an indication to a technician to stop removing laser module 202 any further.

Figure 9:
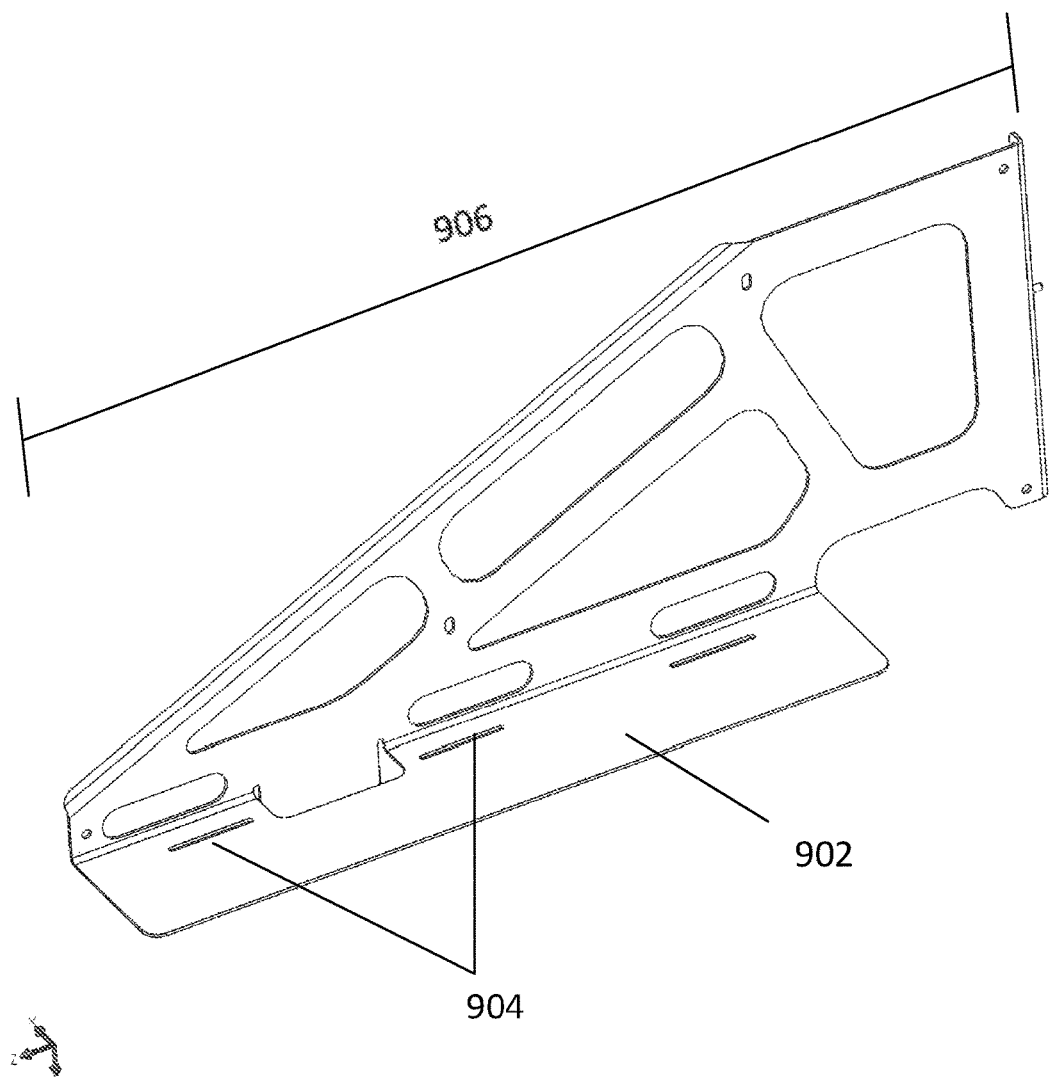
FIG. 9 is a drawing of an example module service shelf arm, in accordance with some embodiments.

FIG. 9 is a drawing of an example module service shelf arm, in accordance with some embodiments. As shown, shelf arm 308 may include support flange 902, crossbeam slots 904 and length 906. Support flanges 902 of shelf arm 308 and shelf arm 306 may form the external module support surface to interface with a bottom of laser module 202 outside of rack 200. Shelf arm 308 may be incorporated in an orientation as shown here on a left side of module support shelf 400 and may be incorporated in an upside-down relative orientation on a right side of module support shelf 300. Crossbeam slots 904 may allow end tabs 802 of shelf crossbeam 310 to be inserted from either an internal or external direction. Length 906 of shelf arm 308 may be chosen relative to a depth of laser module 202 to allow laser module 202 to be supported by the laser module shelf while outside of rack 200.

Figure 10:
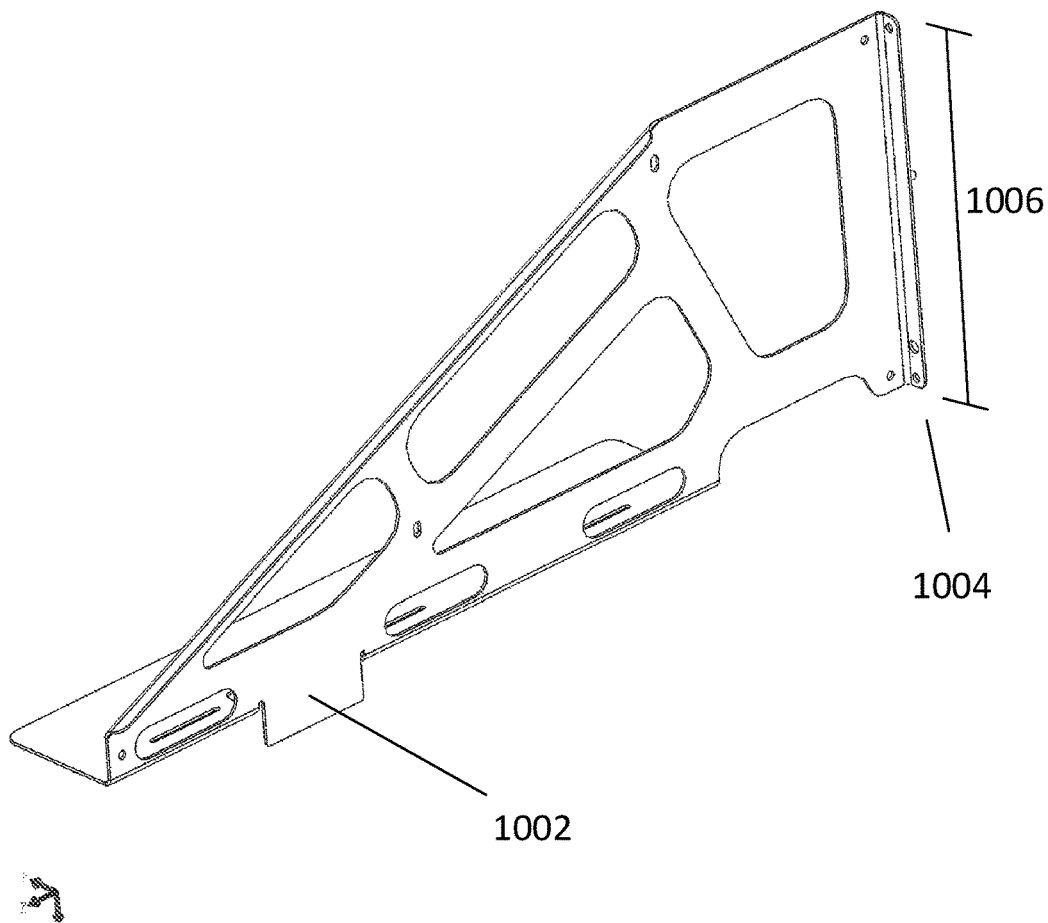
FIG. 10 is a drawing of an example module service shelf arm, in accordance with some embodiments.

FIG. 10 is a drawing of an example module service shelf arm, in accordance with some embodiments. As shown, shelf arm 306 may include alignment tab 1002, rolled edge 1004 and height 1006. Shelf arm 306 may be incorporated in an orientation as shown here on a right side of module support shelf 400 and may be incorporated in an upside-down relative orientation on a left side of module support shelf 300. Alignment tab 1002 may maintain alignment of laser module 202 being supported by module service shelf 300 with opening 204.

Rolled edge 1004 may be incorporated in shelf arms 306 and 308 to provide fittings to attach with attachment struts 304. In some embodiments, however, rolled edge 1004 is not included. Height 1006 may be chosen based on the necessary weight carrying capacity of the module service shelf. In some embodiments, height 1006 is greater than 5 U.

Figure 11A:
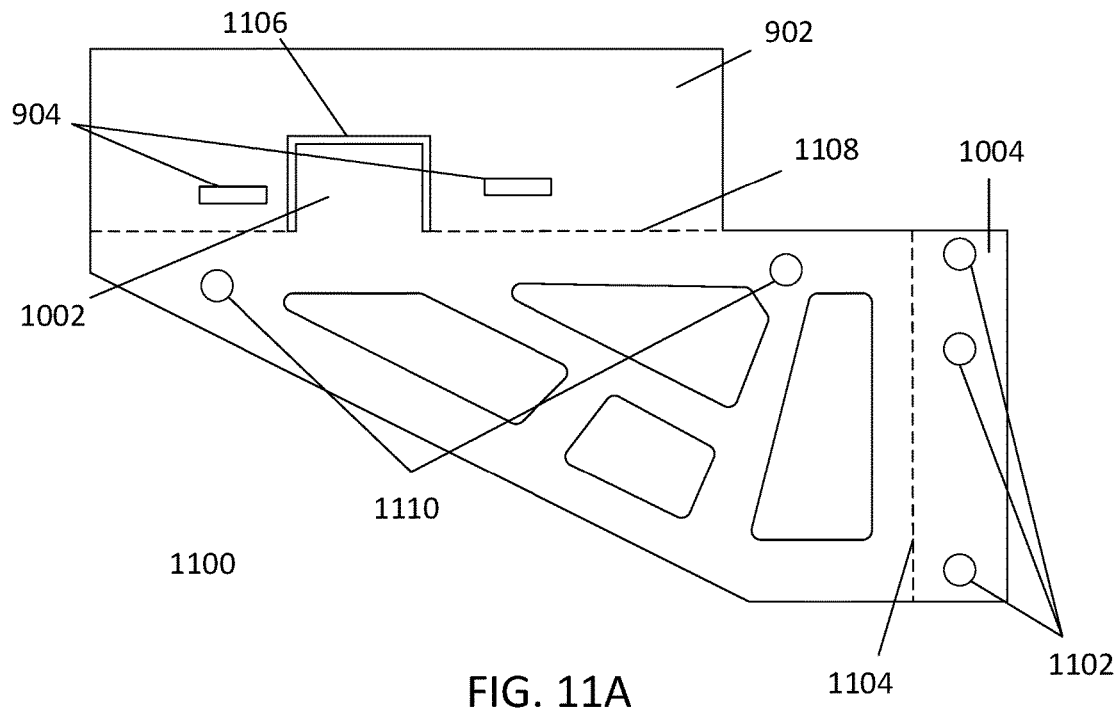
FIGS. 11A and 11B are diagrams of example module service shelf arm sheet cutouts, in accordance with some embodiments.
Figure 11B:
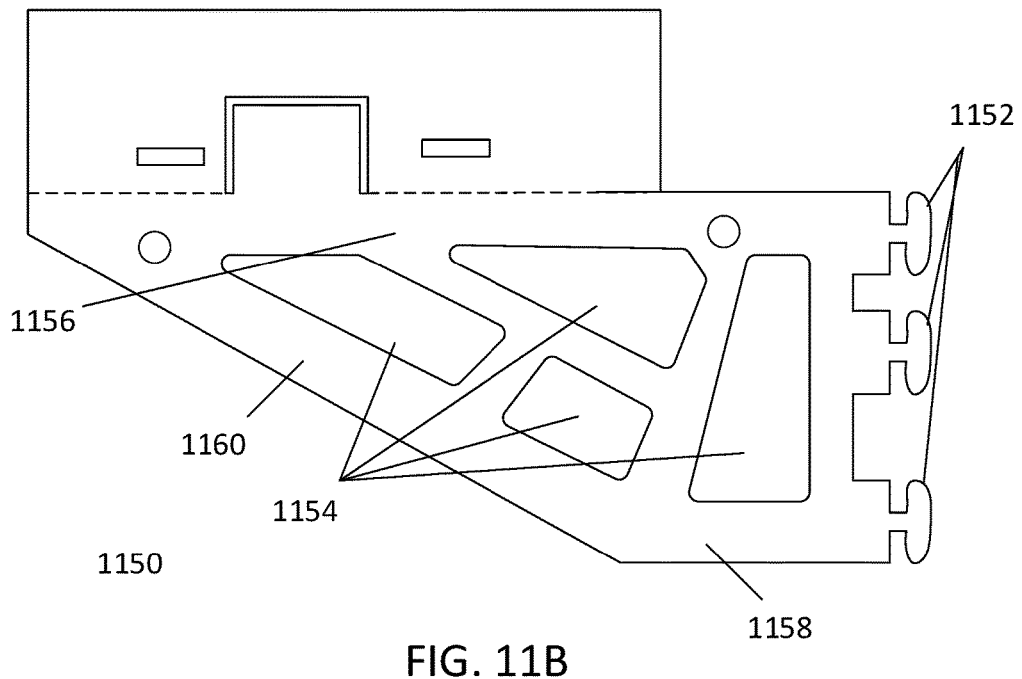

FIGS. 11A and 11B are diagrams of example module service shelf arm sheet cutouts, in accordance with some embodiments. As shown in FIG. 11A, sheet cutout 1100 may include support flange 902, crossbeam slots 904, alignment tab 1002, rolled edge 1004, attachment openings 1102, rolled edge bend-line 1104, alignment tab cutout 1106, support flange bend-line 1108 and mounting holes 1110.

Sheet cutout 1100 may be sheet metal or other bendable durable sheet goods used to form shelf arms 306 and 308.

Support flange 902 may be formed in shelf arms 306 and 308 by bending sheet cutout 1100 along flange bend-line 1104. Shelf arm 306 may include a 90-degree forward bend, while shelf arm 308 may include a 90-degree backward bend. Bending along flange bend-line 1104 may expose alignment tab 1002 based on alignment tab cutout 1106.

In some embodiments, rolled edge 1004 is included in shelf arms 306 and 308 to contain fittings for attachment to attachment struts 304. Rolled edge 1004 may be formed through a 90-degree bend along rolled edge bend-line 1104 in a direction opposite to support flange 902. Attachment openings 1102 may be included in rolled edge 1004 to provide fittings for attachment with attachment struts 304. In some embodiments, one or more attachment openings 1102 are left empty so that screws may be used as attachment fittings, and in some embodiments, one or more attachment openings 1102 are permanently filled with pins or rivets or other attachment fittings. Mounting holes 1110 may be created in sheet cutout 1100 as part of a storage solution for shelf arms 306 and 308, for example as shown in more detail hereinafter.

As shown in FIG. 11B, sheet cutout 1150 may include tabs 1152, cutouts 1154, longer chord 1156, shorter chord 1158 and hip vertical 1160. In some embodiments, instead of a rolled edge 1004 to contain fittings, fittings, such as tabs 1152, may be included in sheet cutout 1150 to form shelf arms 306 and 308. In some embodiments, three tabs 1152 are included at uneven intervals. One skilled in the art would appreciate that this may enable corresponding openings in attachment struts 304 to only allow attachment in one orientation of shelf arms 306 and 308.

Cutouts 1154 may represent sheet metal that has been removed to reduce the material cost and weight of shelf arms 306 and 308 while maintaining structural integrity and weight bearing capacity. Longer chord 1156, along with shorter chord 1158 and hip vertical 1160 may form a simple truss to distribute the weight of a laser module 202 on the module service shelf, through fittings and attachment struts 304, back to rack 200. Other truss or alternative weight-bearing designs may be used in other embodiments.

Figure 12:
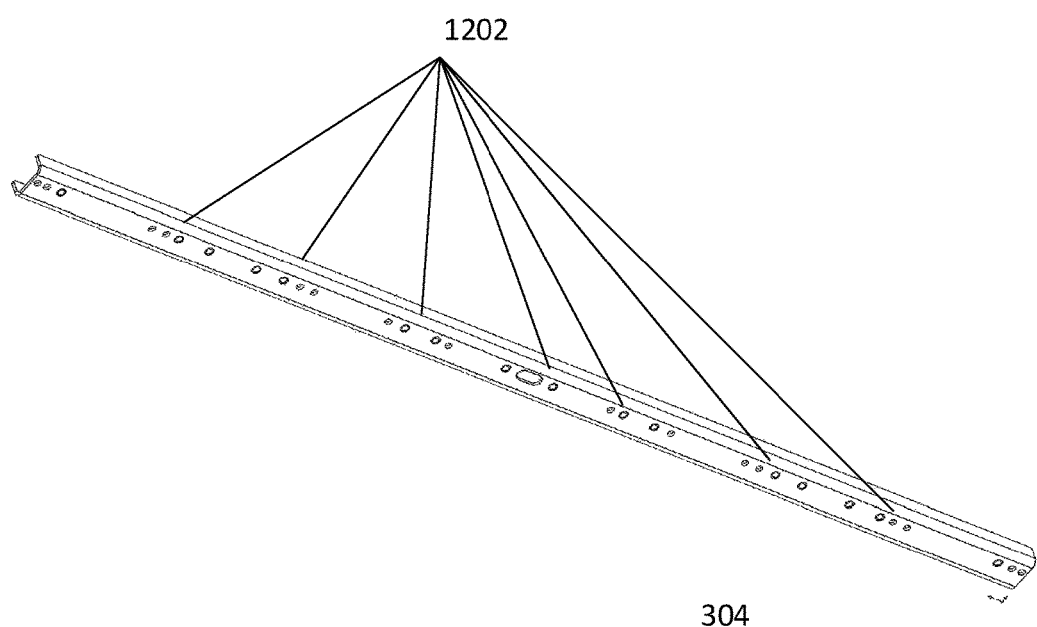
FIG. 12 is a drawing of an example module service shelf attachment strut, in accordance with some embodiments.

FIG. 12 is a drawing of an example module service shelf attachment strut, in accordance with some embodiments. As shown, attachment strut 304 may include attachment index positions 1202. Attachment index positions may include sequences of openings in specific locations to allow attachment with module service shelf 300 or module service shelf 400 such that an external module support surface is aligned with an internal module support surface in rack 200 for each slot 206 for servicing of any of laser modules 202. In some embodiments, attachment index positions 1202 provides attachment positions for only one of module service shelf 300 or module service shelf 400 for servicing a particular laser module 202.

Figure 13:
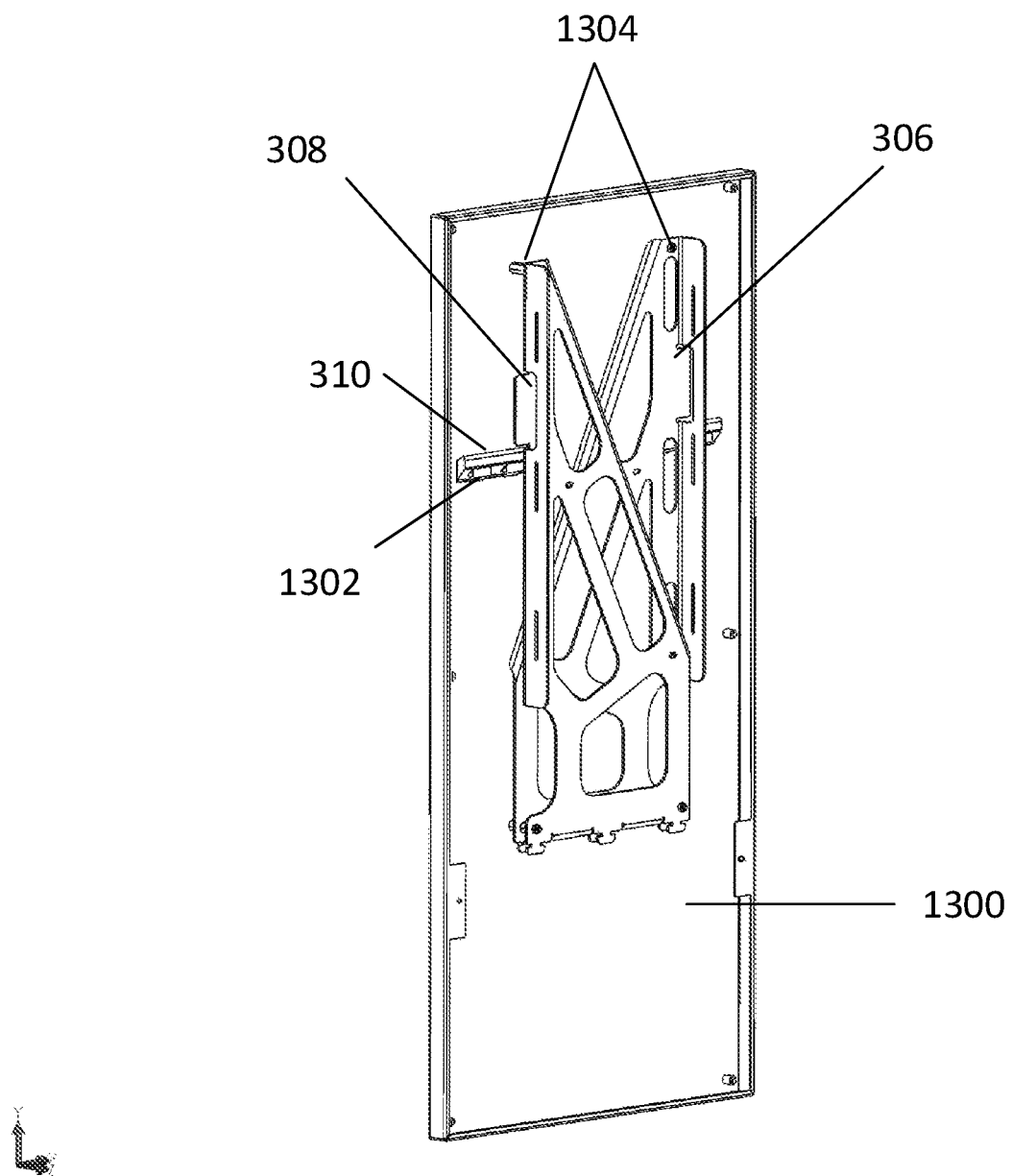
FIG. 13 is a drawing of an example module service shelf storage, in accordance with some embodiments.

FIG. 13 is a drawing of an example module service shelf storage, in accordance with some embodiments. As shown, panel 1300 may include support shelf 1302, standoffs 1304, shelf arm 306, shelf arm 308 and shelf crossbeam 310. Panel 1300 may include a door or chassis panel or other accessible surface within rack 200 to store module service shelf sections. In some embodiments, panel 1300 includes both a shelf 1302 and standoffs 1304, however the present invention is not so limited. While shelf 1302 may support shelf arm 306, shelf arm 308 and shelf crossbeam 310, standoffs 1304 may have openings to allow the sections to be screwed into place, for example through mounting holes 1110 or 804.

Figure 14:
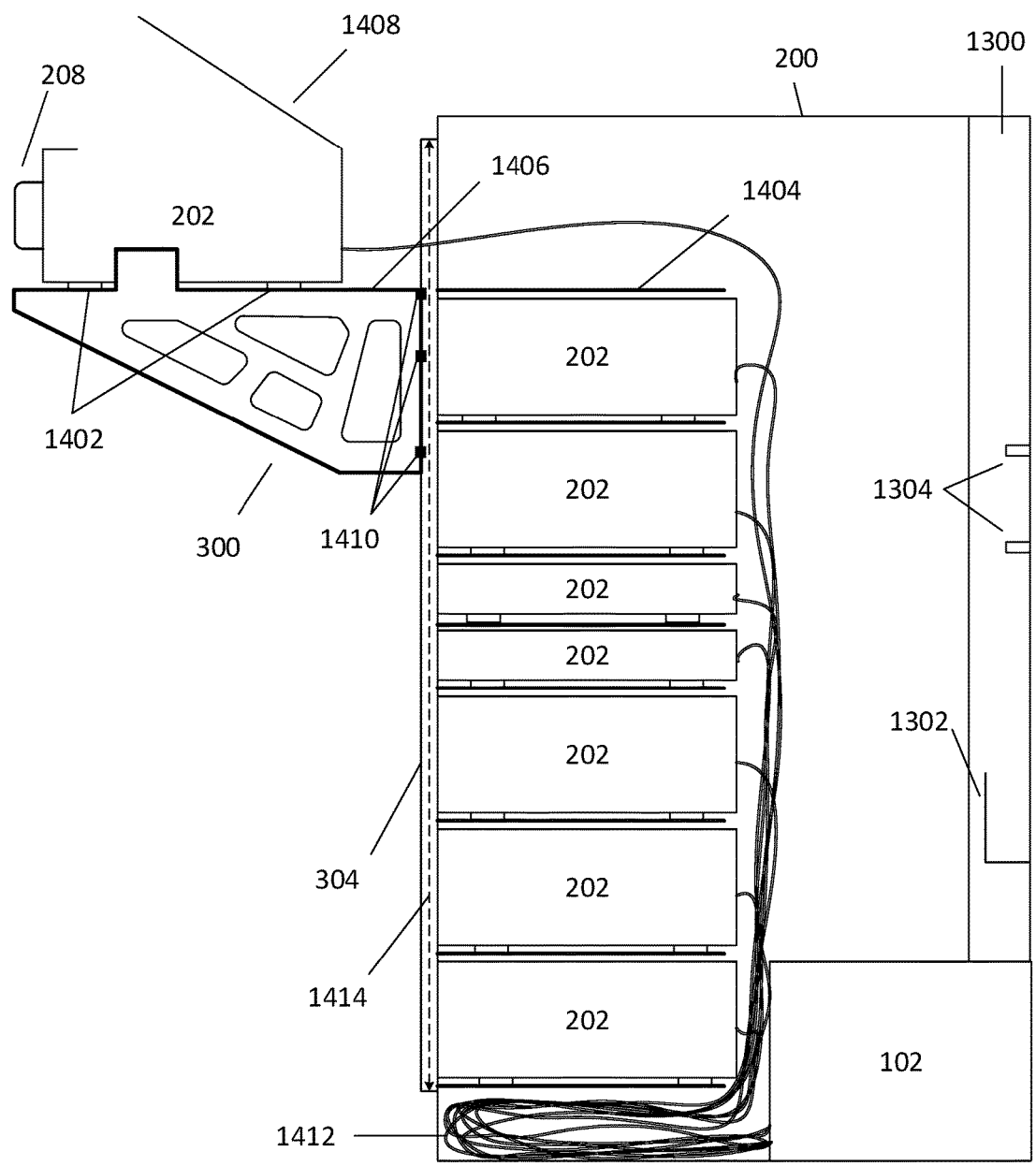
FIG. 14 is a diagram of an example laser system with a module service shelf, in accordance with some embodiments.

FIG. 14 is a diagram of an example laser system with a module service shelf, in accordance with some embodiments. As shown, laser system 100 may include power distribution module 102, rack 200, laser modules 202, handle 208, module service shelf 300, attachment strut 304, panel 1300, support shelf 1302, standoffs 1304, plastic sliders 1402, internal module support surfaces 1404, external module support surface 1406, laser module top 1408, attachment fittings 1410, cables 1412, and longitudinal axis 1414.

In some embodiments, module service shelf 300 may only be attachable to attachment struts 304 in positions (determined by attachment index positions 1202 designed to receive attachment fittings 1410) where external module support surface 1406 is aligned with an internal support surface 1404. Plastic sliders 1402 may be included on a bottom of laser modules 202 to reduce friction and ease installation and removal of laser modules 202.

Internal support surface 1404 may include a pair of internal module support surfaces, each extending substantially orthogonally to longitudinal axis 1414 of one of attachment struts 304, on opposite sides of opening 204. In one embodiment, internal support surface 1404 includes a pair of flanges that extend within opening 204 to substantially the same extent as flanges 902 of external module support surface 1406.

As shown, when outside of rack 200, laser module 202 is cantilevered in alignment with the slot 206 from which it was installed. Module service shelf 300 provides a rigid structural element anchored at only one end to attachment struts 304. Module service shelf 300 carries the load of laser module 202 to attachment struts 304 where it is forced against by a moment and shear stress.

After a laser module 202 has been removed from rack 200 and is being supported by module service shelf 300, laser module top 1408 may be able to be removed for servicing. In some embodiments, service loops in cables 1412 may allow an electrical connection with power distribution module 102 to be maintained when laser module 202 is outside of rack 200.

Figure 15:
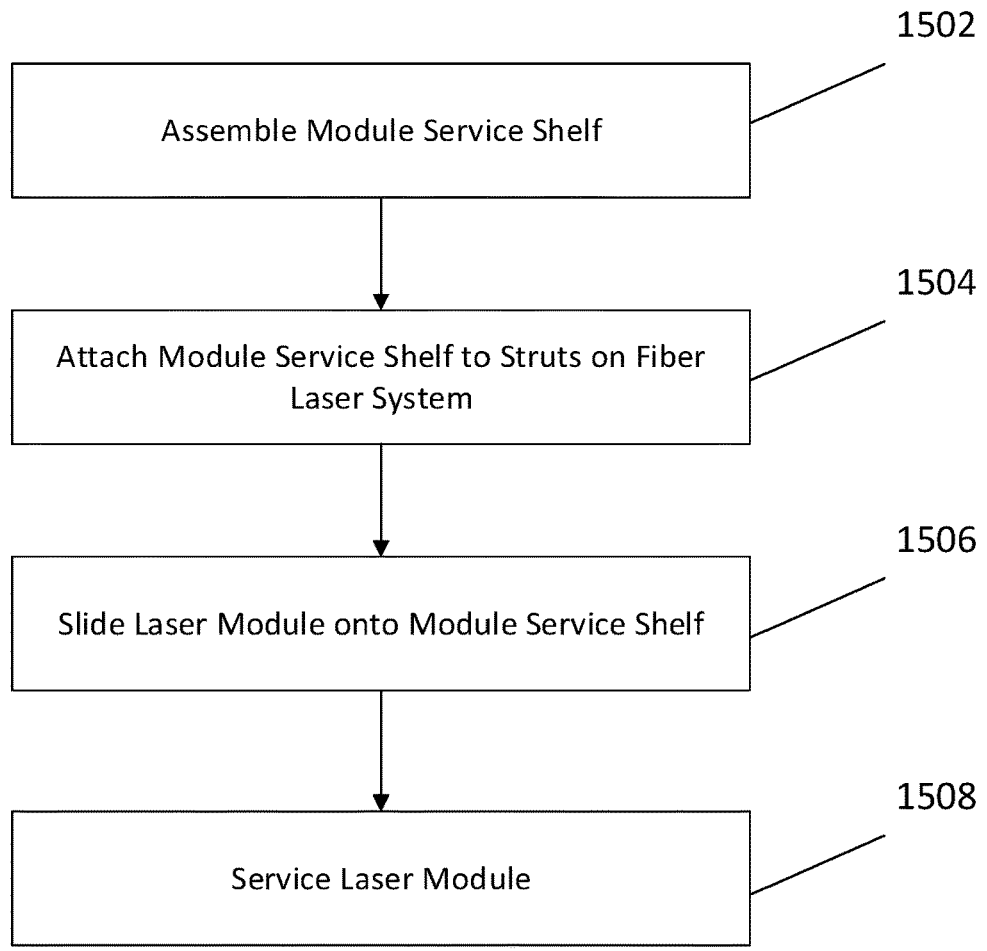
FIG. 15 is a flowchart of an example method for servicing a laser system module with a module service shelf, in accordance with some embodiments.

A flowchart of an example method for servicing a laser system module with a module service shelf, in accordance with some embodiments, is shown in FIG. 15. The method begins with assembling (1502) module service shelf 300 or module service shelf 400. The assembly may involve steps described in more detail in reference to FIG. 16.

The method continues with attaching (1504) module service shelf 300 or 400 to attachment struts 304 on laser system 100. In some embodiments, a technician will have to identify the one set of attachment points in attachment index positions 1202 that will allow a particular laser module to be serviced. One skilled in the art would appreciate that including attachment points in attachment struts 304 that allow misalignment of external module support surface 1406 and internal module support surface 1404 could lead to damage to laser module 202 or injury to the technician. In some embodiments, attachment can include attaching screws or inserting tabs in shelf arms 306 and 308 into slots in attachment struts 304.

Next, laser module 202 is slid (1506) through opening 204 out of rack 200 onto the module service shelf. Plastic sliders 1402 and handles 208 may make sliding of laser module 202 easy for a single person. Additional screws or fasteners (not shown) holding laser module 202 in slot 206 may need to be removed before laser module 202 can be pulled out of rack 200.

The method concludes with servicing (1508) laser module 202. In some embodiments, laser module 202 may be able to fully function while outside of rack 200. In some embodiments, laser module top 1408 may be lifted or removed to access components within laser module 202.

Figure 16:
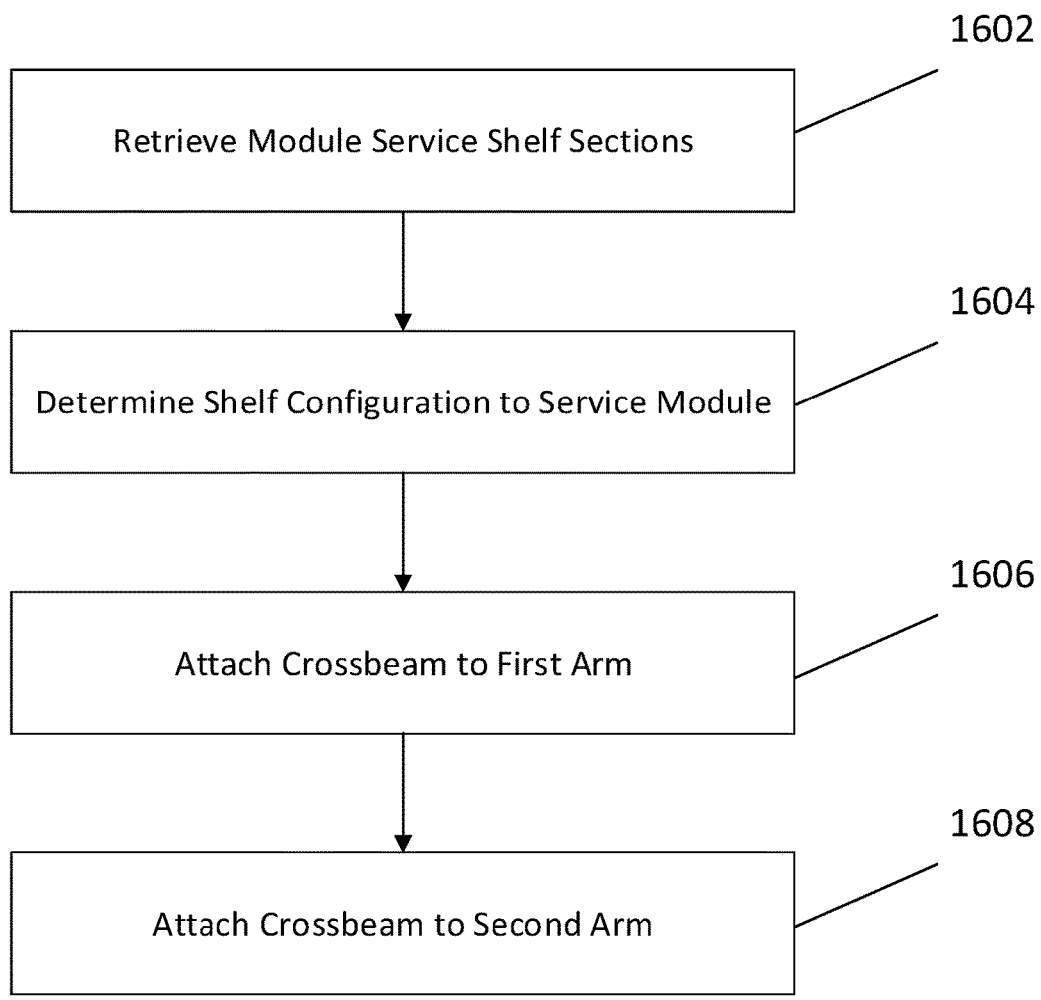
FIG. 16 is a flowchart of an example method for assembling a module service shelf, in accordance with some embodiments.

FIG. 16 is a flowchart of an example method for assembling a module service shelf, in accordance with some embodiments. The method begins with retrieving (1602) the shelf sections of the module service shelf. In some embodiments, the shelf sections are stored on or in panel 1300 internal to rack 200. In some embodiments, screws used to attach the module service shelf to attachment struts 304 are also used to secure the module service shelf section to standoffs 1304.

The method continues with determining (1604) the shelf configuration for the laser module 202 to be serviced. In some embodiments, only one shelf configuration of either module service shelf 300 or module service shelf 400 may be enabled to service a particular laser module 202. The shelf configuration to be used may affect the orientation for attaching shelf crossbeam 310 with shelf arms 306 and 308.

Next, crossbeam 310 may be attached (1606) to one of shelf arm 306 or 308. For example, where module service shelf 300 is to be used shelf crossbeam 310 end tabs 802 may be inserted into slots 904 of flanges 904 of shelf arms 306 and 308 from an external direction.

The method concludes with attaching (1608) crossbeam 310 with the other of arm 306 or 308. For example, where module service shelf 400 is to be used shelf crossbeam 310 end tabs 802 may be inserted into slots 904 of flanges 904 of shelf arms 306 and 308 from an internal direction.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A laser system, comprising:
  a plurality of laser modules to drive light through an optical fiber exiting the system;
  a rack including a stack of slots to support the laser modules in first positions within the rack, wherein the rack comprises a pair of struts extending at, and defining, opposite sides of an external opening in the rack through which the laser modules may pass, the external opening in the rack corresponding to a laser module width; and
  a module service shelf attachable to the struts to support a weight of one of the laser modules of greater than one hundred pounds in a second position that is external from the rack and in alignment with the opening and one of the slots, wherein the module service shelf comprises a plurality of detachable sections.

2. The system of claim 1, wherein:
slots within the rack are defined by a pair of internal module support surfaces, each extending substantially orthogonally to a longitudinal axis of one of the struts;
the struts include discrete attachment points to receive the shelf at a plurality of shelf index positions located relative to the internal module support surfaces; and
the shelf comprises a pair of load supporting arms, each arm further comprising a fitting to mate with one of the attachment points, and a flange to provide an external module support surface to support the weight of one of the laser modules in the second position, the flange aligned substantially coplanar with the internal module support surfaces when the fitting is mated to one of the attachment points.

3. The system of claim 2, wherein:
the flange of each arm is to provide the external module support surface in alignment with a first of the internal module support surfaces when a first arm is mated to an attachment point on a first strut, and a second arm is mated to an attachment point on a second strut; and
the flange of each arm is to provide the external module support surface in alignment with a second of the internal module support surfaces when the first arm is mated to an attachment point on the second strut and the second arm is mated to an attachment point on the first strut.

4. The system of claim 2, wherein the module service shelf further comprises a crossbeam section detachable from the arms and with opposite ends to mate with each of the arms from an interior direction when the arms are attached to the struts in a first shelf orientation and from an exterior direction when the arms are attached to the struts in a second shelf orientation.

5. The system of claim 4, wherein the flanges are to contact a bottom surface of one of the laser modules in the second position.

6. The system of claim 4, wherein the arms further comprise a sheet good, the flange bend orthogonally from a truss portion.

7. The system of claim 4, wherein the arms comprise tabs extending beyond a flange bend-line to maintain a module in alignment with the opening while in the second position while the module service shelf is in the second shelf orientation.

8. The system of claim 4, wherein the struts comprise an opening pattern to interface with the module service shelf only at locations that align flanges in the module service shelf arms with the internal module support surfaces in the rack supporting the laser modules.

9. The system of claim 8, wherein the struts interface with the module service shelf to align the flanges to the internal module support surfaces of each of the slots using a combination of the first shelf orientation and the second shelf orientation, wherein only one shelf orientation aligns the flanges to the internal module support surfaces of any particular one of the slots.

10. The system of claim 9, wherein:
the attachment points comprise a plurality of openings in the struts, wherein the openings in the struts are orthogonal to the opening in the rack; and
the fitting further comprises a plurality of tabs to interface with a plurality of the openings in the struts.

11. The system of claim 10, wherein the first and second arms comprise rolled edges including one or more pins to interface with one or more openings in the struts.

12. A laser system, comprising:
a rack;
a plurality of laser modules mounted in the rack to drive light through an optical fiber exiting the system;
a pair of struts extending vertically and defining sides of a rack external opening, the external opening in the rack corresponding to a laser module width;
a module service shelf attachable to the struts to support a weight of one of the laser modules of greater than one hundred pounds outside of the rack in coplanar alignment with a support surface within the rack, wherein the module service shelf comprises a plurality of detachable sections; and
a storage to store the module service shelf sections.

13. The system of claim 12, wherein the storage comprises a support in a removable panel coupled with the rack of the laser system.

14. The system of claim 13, wherein the module service shelf further comprises:
a first arm;
a second arm; and
a crossbeam section.

15. The system of claim 14, wherein the panel further comprises one or more standoffs and wherein the first and second arms comprise one or more fastener holes to enable fastening of the first and second arms to the one or more standoffs.

16. A method comprising:
assembling a module service shelf from a plurality of sections;
attaching the module service shelf to one of a set number of attachment points within struts attached to a rack of a laser system, the attachment points to provide coplanar alignment between a first support surface within the rack and a second support surface of the module service shelf; and
sliding a laser module, weighing more than one hundred pounds, completely on to the module service shelf.

17. The method of claim 16, wherein assembling the module service shelf comprises inserting a first tab on an end of a crossbeam into a slot in a flange of a first arm and inserting a second tab on an opposite end of the crossbeam into a slot in a flange of a second arm.

18. The method of claim 17, wherein attaching the module shelf comprises inserting a pin in a rolled edge of the first arm into an opening in a first strut, inserting a pin in a rolled edge of the second arm into an opening in a second strut, and fastening the rolled edges and struts together with screws.

19. The method of claim 17, wherein attaching the module shelf comprises inserting tabs in the first arm into openings in a first strut and inserting tabs in the second arm into openings in a second strut.

20. The method of claim 17, further comprising removing a top of the laser module to service the laser module.

* * * * *